US012078326B2

(12) United States Patent
Ebbers et al.

(10) Patent No.: US 12,078,326 B2
(45) Date of Patent: Sep. 3, 2024

(54) AIRCRAFT LIGHT WITH SUPPORT BOARD AND KINEMATIC COUPLING FIXTURE AND AIRCRAFT COMPRISING THE SAME

(71) Applicant: Goodrich Lighting Systems GmbH & Co. KG, Lippstadt (DE)

(72) Inventors: Thomas Ebbers, Bad Wünnenberg (DE); Lars Christian Schröder, Bielefeld (DE); Markus Katzenmayer, Lippstadt (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 0 days.

(21) Appl. No.: 18/167,465

(22) Filed: Feb. 10, 2023

(65) Prior Publication Data

US 2023/0265996 A1  Aug. 24, 2023

(30) Foreign Application Priority Data

Feb. 18, 2022 (EP) .................................... 22157469

(51) Int. Cl.
| F21V 21/14 | (2006.01) |
| B64D 11/00 | (2006.01) |
| B64D 47/04 | (2006.01) |

(52) U.S. Cl.
CPC .............. *F21V 21/14* (2013.01); *B64D 11/00* (2013.01); *B64D 47/04* (2013.01); *B64D 2011/0038* (2013.01); *B64D 2011/0053* (2013.01); *B64D 2203/00* (2013.01)

(58) Field of Classification Search
CPC ....... F21Y 2115/10; F21V 21/14; F21V 17/10
See application file for complete search history.

(56) References Cited

U.S. PATENT DOCUMENTS

| 7,369,334 B2 | 5/2008 | Case et al. |
| 8,545,290 B2 | 10/2013 | Abrahamians |
| 10,815,004 B2 * | 10/2020 | Depta ..................... B64D 47/02 |
| 10,989,382 B2 * | 4/2021 | Jha ........................... B60Q 3/44 |
| 2020/0221615 A1 | 7/2020 | Hatzilias |
| 2020/0409012 A1 | 12/2020 | Sohn |

FOREIGN PATENT DOCUMENTS

| DE | 102016224657 A1 * | 6/2018 |
| EP | 3040282 | 7/2016 |
| EP | 3428072 | 1/2019 |
| EP | 3670354 | 6/2020 |
| EP | 3738889 | 11/2020 |

OTHER PUBLICATIONS

European Patent Office, European Search Report dated Jul. 13, 2022 in Application No. 22157469.2.

* cited by examiner

*Primary Examiner* — Robert J May
(74) *Attorney, Agent, or Firm* — SNELL & WILMER L.L.P.

(57) ABSTRACT

An aircraft light includes a support board; a light source, arranged on the support board; an optical element, arranged over the light source; and a kinematic coupling fixture, establishing a fixed position of the optical element with respect to the support board.

13 Claims, 10 Drawing Sheets

AIRCRAFT LIGHT WITH SUPPORT BOARD AND KINEMATIC COUPLING FIXTURE AND AIRCRAFT COMPRISING THE SAME

CROSS-REFERENCE TO RELATED APPLICATIONS

This application claims priority to, and the benefit of, EP Patent Application No. 22157469.2, filed Feb. 18, 2022 and titled "AIRCRAFT LIGHT AND AIRCRAFT COMPRISING THE SAME," which is incorporated by reference herein in its entirety for all purposes.

FIELD

The present invention is in the field of aircraft lighting. In particular, the present invention is in the field of aircraft lights and aircraft equipped with such aircraft lights. Also, the present invention relates to manufacturing aircraft lights and, in particular, to placing the individual lighting components in the aircraft light.

BACKGROUND

Modern aircraft, such as large commercial passenger airplanes, have a vast range of aircraft lights. On the one hand, a variety of exterior aircraft lights, such as headlights, navigation lights, anti-collision lights, wing/engine scan lights, etc. are typically provided. On the other hand, a variety of interior aircraft lights, such as cabin illumination lights, reading lights, exit sign lights, etc. are also typically provided. Modern commercial passenger airplanes have a very large number of aircraft lights.

In recent years, aircraft lights with traditional light sources have increasingly been replaced by aircraft lights with light emitting diodes (LEDs) as light sources. This has led to aircraft lights where LEDs and optical elements are jointly arranged on and supported by support boards, in particular by circuit boards. With LEDs being small light sources, aircraft lights have been developed that have a very small space envelope. The LEDs and the optical elements are arranged in close proximity to the support boards, leading to low overall space requirements. However, such aircraft lights are not always satisfactory in terms of mechanical stability and accuracy of the light output.

Accordingly, it would be beneficial to provide an aircraft light with a highly accurate light output and with a highly robust mechanical set-up. Also, it would be beneficial to provide an aircraft equipped with such aircraft light(s).

SUMMARY

Exemplary embodiments of the invention include an aircraft light comprising: a support board; a light source, arranged on the circuit board; an optical element, arranged over the light source; and a kinematic coupling fixture, establishing a fixed position of the optical element with respect to the support board.

Exemplary embodiments of the invention allow for a highly accurate relative placement of an optical element and a light source within an aircraft light. In this way, a highly accurate light output of the combination of the light source and the optical element may be achieved. In particular, the kinematic coupling fixture may allow for a high degree of certainty of location for the optical element, when placing the optical element on the support board during assembly of the aircraft light.

With the kinematic coupling fixture, a highly exact position of the optical element with respect to the support board may be achieved due to the inherent nature of the kinematic coupling fixture. By definition, the kinematic coupling fixture has a set of mechanical interfaces, wherein at least some of these mechanical interfaces allow for a quite large variability in relative positioning between the optical element and the support board, when looked at in isolation. Via the geometries and the relative positions/orientations of the mechanical interfaces, the optical element falls into place on the support board during assembly of the aircraft light. The optical element assumes its intended position to a high degree of accuracy and with a high degree of ease of placement during manufacture.

The beneficial placement of the optical element on the support board is particularly apparent from the comparison of the kinematic coupling fixture with the previous approach of inserting three pins, extending from the optical element, into three receptacles on the support board. Due to manufacturing tolerances and the designing around these tolerances, it is likely that the pins will be inserted into the receptacles and still have play with respect to the support board or that one or more pins will have to be deformed for simultaneously inserting the three pins into the support board. In other words, in previous approaches, the mounting of the optical element to the support board may lead to a not fully determined position of the optical element with respect to the support board or to an unintended deformation of the optical element for being fitted to the support board. As compared thereto, the kinematic coupling fixture may lead to a well-defined singular position of the optical element with respect to the support board. A high accuracy of the light output may be achieved in a highly reliable manner.

Also, the kinematic coupling fixture may provide for a positioning framework that allows for a reliable and strong ensuing mechanical fixation of the optical element on the support board. In this way, the highly accurate relative positioning between the light source and the optical element may be made very durable and robust within the framework of the aircraft light. With a robust mechanical set-up, the maintenance efforts for the aircraft light and, thus, the downtime of the aircraft may be kept low.

The aircraft light comprises a light source arranged on the support board. The light source is fixed in position on the support board. In particular, the light source may be fixed in position on the support board via gluing or soldering or in any other suitable manner.

The light source may be an LED. It is also possible that the light source comprises a plurality of LEDs. The plurality of LEDs may be arranged in close proximity to each other, forming a light-emitting cluster.

Establishing the fixed position of the optical element with respect to the support board via the kinematic coupling fixture is particularly beneficial in an aircraft light. The kinematic coupling fixture is an effective way of addressing an increasing demand in light output accuracy of aircraft lights. The kinematic coupling fixture and the resulting accurate relative positioning of the light source and the optical element may help in addressing legal requirements for light output accuracy, such as the sharp cut-off between the red, green and white sectors of aircraft navigation lights, and/or demands for light output accuracy by aircraft manufacturers and/or aircraft operators, such as the demand for a highly accurate illumination of a landing target by a landing light. Also, the kinematic coupling fixture provides a framework that allows for a robust mechanical coupling between the optical element and the support board. In this way, the kinematic coupling fixture may help in addressing and withstanding the high mechanical strains in an aircraft environment, such as strong mechanical shocks, e.g. at touchdown, extended applications of vibrational strains, and—at least for exterior aircraft lights—high mechanical strains due to large variations in temperature, humidity, etc. In this context, the kinematic coupling fixture may help in addressing both the regularly experienced mechanical strains as well as the hypothetical mechanical strains that are taken into account for exceptional situations, such as emergency landings, and that may be a multiple of the mechanical strains during regular operation. With the kinematic coupling fixture, a highly accurate light output may be provided, while creating a framework that allows for high mechanical robustness.

The light source and the optical element may join to form the light output of the aircraft light. It is also possible that the light source and the optical element jointly form part of the light output of the aircraft light. In particular, it is possible that the aircraft light has a plurality of design units/building blocks, wherein each of said design units/building blocks has a light source, arranged on the support board, an optical element, arranged over the light source, and a kinematic coupling fixture, establishing a fixed position of the optical element with respect to the support board. The plurality of design units/building blocks may jointly provide the light output of the aircraft light. In such a set-up, the light outputs of the design units/building blocks may cooperate in a highly accurate manner and lead to an overall highly accurate light output of the aircraft light. The additional features, modifications and effects, as described herein with respect to a single combination of a light source, an optical element, and a kinematic coupling fixture, apply to implementations of aircraft lights with a plurality of such combinations in an analogous manner.

According to a further embodiment, the kinematic coupling fixture constrains six degrees of freedom of the optical element with respect to the support board. In particular, the kinematic coupling fixture may constrain three translational degrees of freedom and three rotational degrees of freedom. In this way, the optical element may be exactly constrained with respect to the support board. The optical element may be neither over-constrained nor under-constrained with respect to the support board. The constraining of the optical element with respect to the support board in six degrees of freedom may be achieved via a set of mechanical interfaces. Each of the set of mechanical interfaces may constrain one or two or three degrees of freedom.

According to a further embodiment, the kinematic coupling fixture comprises: three constraint shoes, arranged on the support board; and three coupling legs, each coupling leg extending from the optical element and being in engagement with a respective one of the three constraint shoes. In other words, each coupling leg may be associated with a respective one of the three constraint shoes. Thus, three pairs of a respective constraint shoe and a respective coupling leg may be formed. Each of the three pairs of constraint shoes and coupling legs may form a mechanical interface of the kinematic coupling fixture. The term constraint shoe, as used herein, refers to a receiving structure for a coupling leg. The kinematic coupling fixture may have exactly three constraint shoes and three coupling legs, i.e. exactly three mechanical interfaces between the optical element and the support board. The three pairs of constraint shoes and coupling legs may provide for six contact points between the optical element and the support board. The six contact points may constrain the optical element with respect to the support board in six degrees of freedom.

According to a further embodiment, the three pairs of constraint shoes and coupling legs are arranged around the light source. In this way, the arrangement of the optical element over the light source may be achieved in a particularly stable manner. The joint provision of positioning accuracy and mechanical stability may be achieved in a particularly effective manner.

According to a further embodiment, each of the three constraint shoes comprises a v-shaped groove. The term v-shaped groove refers to a groove whose side faces are inclined. While the term v-shaped groove may refer to a groove that represents a full v in cross-section, the cross-section of the groove does not have to be a full v. For example, the bottom of the v can be cut-off or flattened. Even with such a cut-off or flattened bottom, the v-shaped groove still has inclined side faces and is considered v-shaped. V-shaped grooves are effective receiving structures for the coupling legs, extending from the optical element, and allow for an effective, multi-point engagement between the respective coupling leg and the respective constraint shoe. In particular, each of the v-shaped grooves may provide two contact points between the optical element and the support board.

According to a further embodiment, the v-shaped grooves are arranged around a center portion of the kinematic coupling fixture and are orientated towards the center portion of the kinematic coupling fixture. The v-shaped grooves may be considered radial grooves, when seen from the center portion of the kinematic coupling fixture. In such an arrangement, the v-shaped grooves are angled with respect to each other. In other words, no two v-shaped grooves coincide in direction or are parallel in direction, with the direction being defined as a virtual line running along the respective groove.

According to a further embodiment, the three constraint shoes are arranged around the light source in a non-rotationally-symmetric manner. In particular, the three v-shaped grooves may be arranged around the light source in a non-rotationally-symmetric manner. For example, as seen from the light source and/or as seen from the center portion of the kinematic coupling fixture, two of the three constraint shoes may be arranged at an angle of about 90° with respect to each other, with the third constraint shoe being arranged at an angle of about 135° with respect to each of the other two constraint shoes. Other distributions of the three constraint shoes around the light source are possible as well. With a non-rotationally-symmetric arrangement of the three constraint shoes around the light source, the optical element may fit into the three constraint shoes in one orientation only. This may help in providing an efficient assembly process. An efficient assembly process may help with the high numbers of aircraft lights commonly installed in modern aircraft. The optical element may have three coupling legs that are distributed around the optical element in a matching manner, i.e. in an arrangement matching the distribution of the constraint shoes around the light source.

According to a further embodiment, the three constraint shoes are substantially equally spaced from the light source and/or from the center portion of the kinematic coupling fixture. Analogously, the three coupling legs may be substantially equally spaced from the light source and/or from the center portion of the kinematic coupling fixture. In this way, a particularly high degree of mechanical stability of the optical element with respect to the support board may be achieved.

According to a further embodiment, the three constraint shoes are attached to the support board. In particular, the three constraint shoes may be glued to or soldered to or fixed to the support board in any other suitable manner. Alternatively, it is possible that the three constraint shoes are machined into the support board. In any of these cases, the three constraint shoes have fixed positions with respect to the support board.

According to a further embodiment, each of the three coupling legs has an at least partially spherical engagement portion. The term at least partially spherical engagement portion may refer to an at least semi-spherical engagement portion, with the semi-spherical shape facing the respective constraint shoe. Said semi-spherical shape may be well-suited for achieving a multi-point contact with the constraint shoe, in particular with a constraint shoe in the form of a v-shaped groove. The term semi-spherical does not exclude the provision of an additional coupling element at the very end of the coupling leg, such as described below, and/or a somewhat flattened end of the semi-spherical shape, facing the constraint shoe, or another shape modification at the end part of the at least partially spherical engagement portion.

According to a further embodiment, each of the three coupling legs has a fixing rod, extending through the respective constraint shoe and extending into or through the support board. In this way, the coupling legs may integrate the mating functionality for the kinematic coupling fixture with the mechanical fixation functionality between the optical element and the support board. During assembly of the aircraft light, the engagement portions of the coupling legs may engage with the constraint shoes for establishing the fixed position of the optical element with respect to the support board. In an ensuing operation, the fixing rods may be worked for achieving the mechanical fixation between the optical element and the support board, while maintaining the fixed position established by the kinematic coupling fixture. The fixing rod may be used in any suitable manner for achieving the mechanical fixation.

According to a further embodiment, the fixing rod is permanently fixed to the support board. The term permanently fixed refers to a fixation of the fixing rod with respect to the support board that can only be undone by destruction of the fixing rod and/or by destruction of a joint between the fixing rod and the support board and/or by any other irreversible breaking operation. For example, the fixing rod may be soldered to the support board. In this way, the fixing rod is permanently fixed to the support board, because the fixation can only be undone by breaking the solder joint. In another example, the fixing rod may be bent around a backside of the support board, thus clamping the optical element to the support board. The bending of the fixing rod around the backside of the support board may be such that a straightening of the fixing rod is not possible without destroying the same. In other words, the fixing rod may be plastically deformed, when clamped to the backside of the support board.

While kinematic coupling fixtures have traditionally been used in situations where a component is repeatedly placed onto and removed from another component, in order to ensure positional accuracy over the course of multiple placements of the component, the provision of the kinematic coupling fixture for positioning accuracy in combination with the provision of the fixing rods for achieving a permanent fixation has been found to be particularly beneficial in the framework of an aircraft light. With the help of the kinematic coupling fixture, an accurate one-time placement of the optical element with respect to the support board may be achieved during assembly of the aircraft light. Said accurate positioning may be effectively maintained throughout the operating life of the aircraft light via the permanent fixation of the optical element with respect to the support board. In this context, the described fixing rods, which are integrated with the coupling legs of the kinematic coupling fixture, have been found to be very effective for maintaining the accurate placement of the optical element and for providing a low-component, low-space integration of the kinematic coupling fixture with the permanent fixation functionality.

According to a further embodiment, the support board is a printed circuit board or a molded interconnect device. In this way, the optical element may be mounted directly to the structure that also has the electrical connections for the light source and that may also support further electric components of the aircraft light, such as light source driver circuitry, power connections, performance and/or temperature sensors, etc.

According to a further embodiment, the optical element comprises at least one of: a reflector, a lens, a lens reflector combination, a lens shutter combination. With the kinematic coupling fixture, a high degree of flexibility in attaching optical elements to the support board of the aircraft light may be achieved. In particular, any kind of optical element or optical element combination may be mounted to the support board in an accurate manner, as long as the optical element/the optical element combination is able to carry appropriate coupling elements for the kinematic coupling fixture, such as appropriate coupling legs.

According to a further embodiment, the aircraft light is an exterior aircraft light. A high mechanical strength of the attachment between the support board, the optical element, and the light source as well as an accurate relative positioning between the light source and the optical element may be particularly beneficial in the field of exterior aircraft lighting. High accuracy in the light output and high mechanical reliability may be achieved simultaneously.

According to a further embodiment, the aircraft light is at least one of a navigation light, a white anti-collision strobe light, a red-flashing beacon light, a take-off light, a taxi light, a runway turn-off light, a landing light, a logo light, a cargo light, a wing scan light, an engine scan light, and a search light, in particular a helicopter search light. The expression of the aircraft light being at least one of a navigation light, a white anti-collision strobe light, a red-flashing beacon light, a take-off light, a taxi light, a runway turn-off light, a landing light, a logo light, a cargo light, a wing scan light, an engine scan light, and a search light means that the aircraft light has the functionality of at least one of a navigation light, a white anti-collision strobe light, a red-flashing beacon light, a take-off light, a taxi light, a runway turn-off light, a landing light, a logo light, a cargo light, a wing scan light, an engine scan light, and a search light. The aircraft light may be a multi-purpose exterior aircraft light, combining any subset of the stated functionalities. The aircraft light may in particular be well-suited for the demanding environment of aircraft headlights, such as well-suited for strong headwinds and heavy impacts/vibrations, e.g. when mounted to a running gear of an aircraft. Also, a high accuracy of the light output may allow for the pilot(s) of the aircraft to have good visibility of the aircraft environment, such as a good visibility of the landing runway in case of a landing light.

As stated above, the aircraft light may have multiple instances of a light source, an optical element, and a kinematic coupling fixture. In the field of exterior aircraft lighting, high light intensities may thus be achieved, while providing a high level of light output accuracy.

According to a further embodiment, the aircraft light is an interior aircraft light. In a particular embodiment, the interior aircraft light is a personal reading light for being provided in an aircraft cabin. With the high accuracy of the light output of the personal reading light, a sufficient illumination of the passenger's personal space may be achieved in an efficient manner, without disturbing passengers in adjacent seats. The interior aircraft light may also be at least one of a cabin illumination light, a washroom illumination light, a galley illumination light, an aisle guidance light, and an exit sign light. The expression of the aircraft light being at least one of a cabin illumination light, a washroom illumination light, a galley illumination light, an aisle guidance light, and an exit sign light means that the aircraft light has the functionality of at least one of a cabin illumination light, a washroom illumination light, a galley illumination light, an aisle guidance light, and an exit sign light. The aircraft light may be a multi-purpose interior aircraft light, combining any subset of the stated functionalities.

As stated above, the aircraft light may have multiple instances of a light source, an optical element, and a kinematic coupling fixture. This also applies to the implementation as an interior aircraft light.

Exemplary embodiments of the invention further include an aircraft, comprising at least one aircraft light in accordance with any of the embodiments described above. The additional features, modifications and effects, described above with respect to the exemplary embodiments of the aircraft light, apply to the aircraft in an analogous manner. The aircraft may be an airplane or a rotorcraft, such a helicopter, or an unmanned aerial vehicle.

BRIEF DESCRIPTION OF THE DRAWINGS

Further exemplary embodiments of the invention will be described with respect to the accompanying drawings, wherein.

DETAILED DESCRIPTION

Figure 1A:
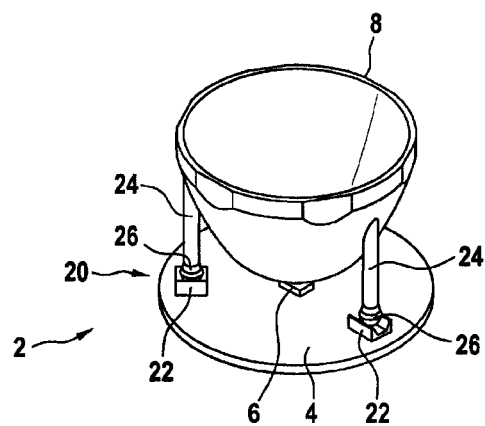
FIGS. 1A to 1F show an aircraft light in accordance with a first exemplary embodiment of the invention and selected components thereof in various views.

FIG. 1A shows an aircraft light 2 in accordance with a first exemplary embodiment of the invention in a perspective view. The aircraft light 2 comprises a support 4, a light source 6, which is an LED 6 in the exemplary embodiment of FIG. 1, and a reflector 8. In the perspective view of FIG. 1A, the support board 4 is shown as having a disc shape, with the LED 6 being arranged at the center of said disc. It is understood that the support board 4 may have different shapes and may be more extensive than shown in FIG. 1A. It is also understood that the support board 4 may support more than the depicted components of the aircraft light 2.

The reflector 8 is arranged over the light source 6. The reflector 8 has a cut-out section facing towards the support board 4. At least a portion of the light, emitted by the LED 6, enters the reflector 8 through the cut-out portion and is reflected by the reflector 8. In the exemplary embodiment of FIG. 1, the reflector 8 has a substantially parabolic shape. A portion of the light, as emitted by the LED 6, is reflected by the reflector 8 and is collimated by the reflector 8, due to its parabolic shape, in a main light emission direction, substantially perpendicular to the support board 4. It is understood that the reflector 8 may have different geometries and/or set-ups with respect to the LED 6. The reflector 8 is an optical element that is arranged over the LED 6 and that conditions the light output of the LED 6.

The aircraft light 2 further comprises a kinematic coupling fixture 20, establishing a fixed position of the reflector 8 with respect to the support board 4. The kinematic coupling fixture 20 comprises three constraint shoes 22 and three coupling legs 24. Each of the coupling legs 24 has an engagement portion 26 at its support board facing end. The engagement portions 26 of the coupling legs 24 are in engagement with the constraint shoes 22, as will be described in more detail below. While there are three pairs of constraint shoes 22 and coupling legs 24, only two of those pairs are depicted in FIG. 1A, because one of the pairs is blocked from view by the reflector 8. Via the kinematic coupling fixture 20, the reflector 8 assumes its intended position with respect to the support board 4 and, thus, with respect to the LED 6 with a high degree of accuracy.

The support board 4 may be a printed circuit board (PCB) or a molded interconnect device (MID). The support board 4 may have further electric components integrated into the support board 4, such as conductors to the LED 6. Also, the support board may support further electric components, such as power terminals for connection to an external power source, such as drive circuitry for the LED 6, etc.

The aircraft light 2 may comprise components that are not depicted in FIG. 1A for clarity of illustration. For example, the aircraft light 2 may have a light transmissive shield, such as a light transmissive lens cover, in order to protect the depicted components from adverse environmental influences. The lens cover may have a dome shape and may be arranged over the LED 6 and the reflector 8. It is also possible that the lens cover is a substantially plainer shield that is arranged substantially parallel to the support board 4. With such protective structure, the aircraft light 2 may be conveniently placed in the interior of an aircraft, with the protective structure preventing passenger interference with the components of the aircraft light 2, or may be conveniently placed on the exterior of an aircraft, with the protective structure shielding the components of the aircraft light 2 from environmental influences, such as particle impact, aerodynamic drag, potentially corroding exhaust gases, humidity and ice build-up on the components, etc.

Figure 1B:
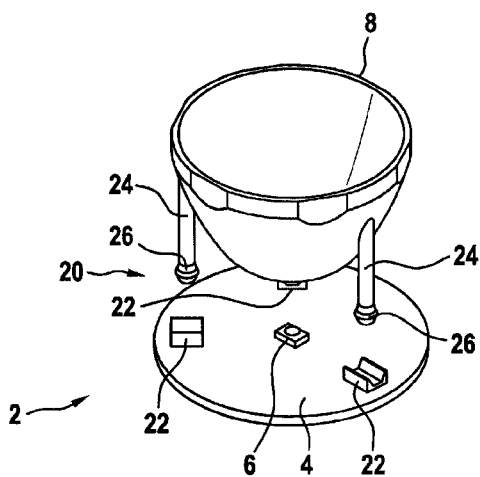

FIG. 1B shows the aircraft light 2 of FIG. 1A in a partially assembled state. In particular, FIG. 1B shows the reflector 8 and its coupling legs 24 separated from the support board 4. In this separated view, details of the constraint shoes 22 and the engagement portions 26 of the coupling legs 24 can be seen with more clarity than in the assembled state of FIG. 1A. Each of the constraint shoes 22 comprises a v-shaped groove. Each of the coupling legs 24 comprises a substantially spherical engagement portion 26. During assembly of the aircraft light 2, the spherical engagement portions 26 are set into the v-shaped grooves of the constraint shoes 22. The combination of the three spherical engagement portions 26 and the three v-shaped grooves of the constraint shoes 22 results in a six point contact between the reflector 8 and the support board 4. Via these six contact points, the reflector 8 is constrained in six degrees of freedom with respect to the support board 4. Its position with respect to the support board 4 is exactly constrained. During assembly of the aircraft light 2, the reflector 8 falls into its intended position with respect to the LED 6 with high positional accuracy.

The three pairs of constraint shoes 22 and coupling legs 24 are arranged around the LED 6. In particular, the three pairs of constraint shoes 22 and coupling legs 24 are substantially equally spaced from the LED 6 and are distributed around the circumference of the reflector 8. In this way, a highly stable mechanical engagement between the support board 4 and the reflector 8 may be achieved.

Figure 1C:
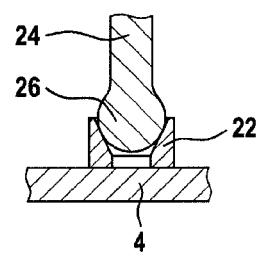

FIG. 1C illustrates the engagement between a single constraint shoe 22 and a single engagement portion 26 of a single coupling leg 24 in a cross-sectional view. The cross-sectional plane of FIG. 1C is orthogonal to the support board 4. Also, the cross-sectional plane of FIG. 1C is orthogonal to the longitudinal direction of the v-shaped groove.

The constraint shoe 22 comprises a v-shaped groove in that the side faces of the groove are inclined, i.e. the side faces of the groove are inclined with respect to the support board 4 and with respect to a plane orthogonal to the support board 4 and running along the longitudinal direction of the v-shaped groove. The substantially spherical engagement portion 26 of the coupling leg 24 rests on the side faces of the v-shaped groove of the constraint shoe 22. In particular, the substantially spherical engagement portion 26 has exactly two contact points with the v-shaped groove of the constraint shoe 22.

In the exemplary embodiment of FIG. 1, the substantially spherical engagement portions 26 are larger in diameter than the remainder of the coupling legs 24. Other ratios between the diameters of the substantially spherical engagement portions 26 and the remainder of the coupling legs 24 are possible as well.

Figure 1D:
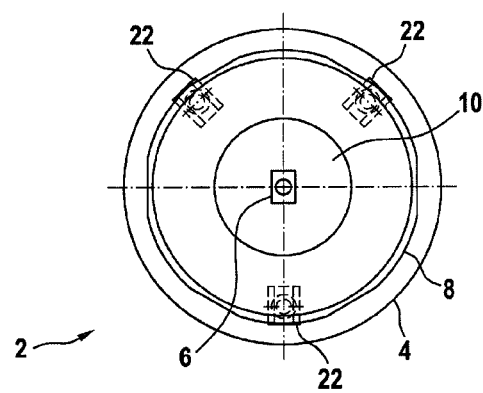

FIG. 1D shows the aircraft light 2 of FIG. 1A in a top view. In this top view, above described cut-out section 10 of the reflector 8 is visible. Due to the cut-out section 10, the LED 6 is visible in FIG. 1D. The constraint shoes 22 are almost entirely blocked from view by the reflector 8, with the blocked portions of the constraint shoes 22 being shown in phantom.

Figure 1E:
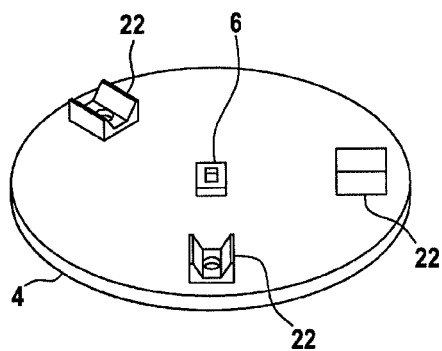

FIG. 1E shows a perspective view of the support board 4, the LED 6, and the constraint shoes 22 of the aircraft light 2 of FIG. 1A. In the absence of the reflector 8 and its coupling legs 24, the geometry of the v-shaped grooves is particularly apparent. In particular, the v-shaped grooves of the constraint shoes 22 have inclined side faces and a bottom structure, wherein at least parts of the bottom structure are substantially parallel to the support board 4. The geometry of the depicted constraint shoes 22 is considered to have a v-shaped groove, despite the v being cut off at the bottom.

Figure 1F:
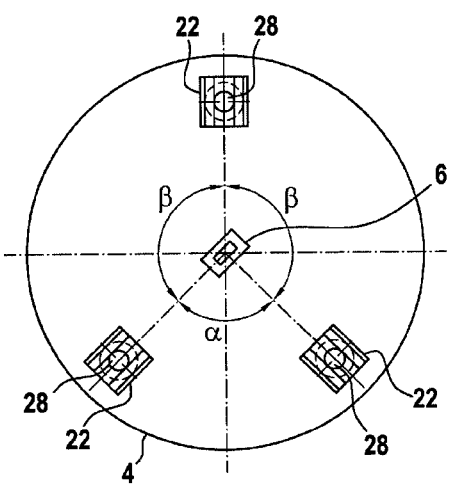

FIG. 1F shows the components of FIG. 1E in a top view. The v-shaped grooves of the constraint shoes 22 are directed towards the LED 6, i.e. they are directed toward the center of the kinematic coupling fixture 20. As seen from the LED 6, two of the v-shaped grooves are angled at an angle α of about 90° with respect to each other. The remaining v-shaped groove is angled at an angle ß of about 135° with respect to the other two v-shaped grooves. In this way, the three constraint shoes 22 are arranged around the LED 6 in a non-rotationally-symmetric manner. The reflector 8 can only be positioned with respect to the support board 4 in one orientation.

As can be seen in FIG. 1F, each of the constraint shoes 22 has an opening 28 into the support board 4. The openings 28 may in particular extend through the support board 4. While the openings are not made use of and can be omitted from the exemplary embodiment of FIG. 1, their purpose will come apparent from the description of the modification of FIG. 2 below.

Figure 2:
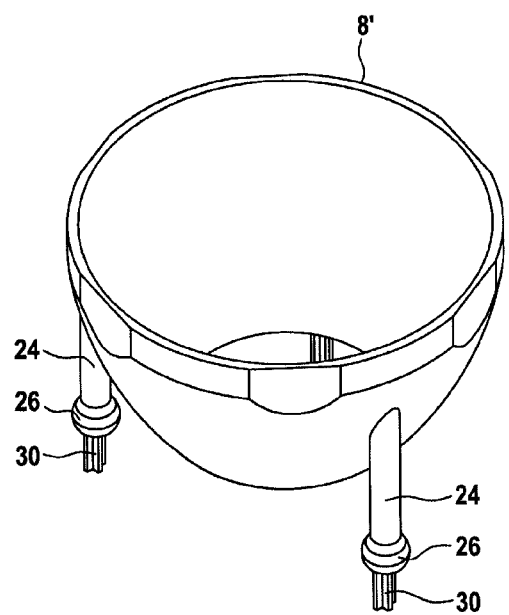
FIG. 2 shows a modified component of the aircraft light of FIG. 1 in a perspective view.
Figure 3A:
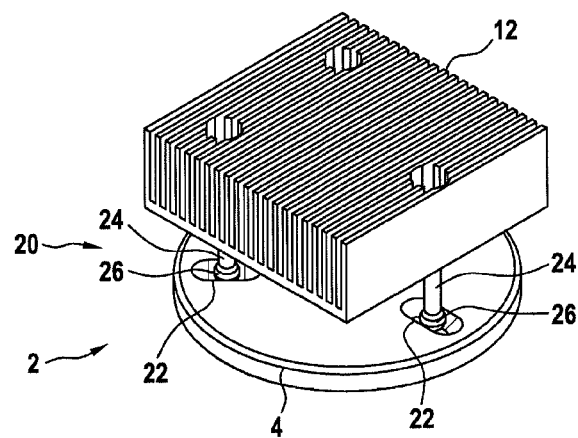
FIGS. 3A to 3D show an aircraft light in accordance with a second exemplary embodiment of invention and selected components thereof in various views.
Figure 3B:
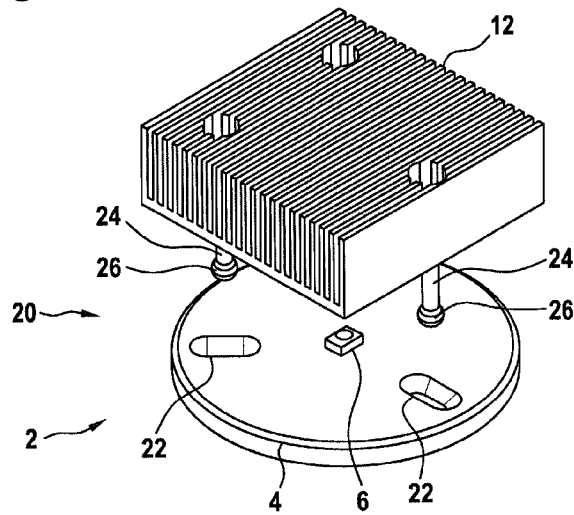
Figure 3C:
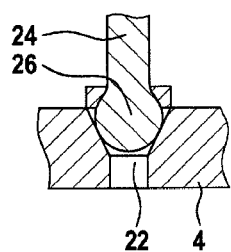
Figure 3D:
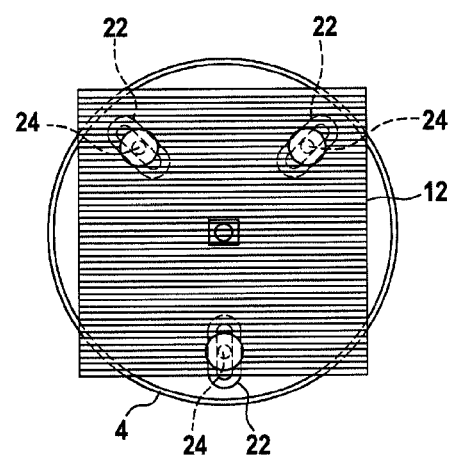

FIG. 2 shows a modified reflector 8', as may be used in the aircraft light 2 of FIG. 1, in a perspective view. The reflector 8' of FIG. 2 differs from the reflector 8 of FIG. 1 in that the coupling legs 24 are modified. In particular, the coupling legs 24 have, in addition to the substantially spherical engagement portions, fixing rods 30. In the pre-assembled state depicted in FIG. 2, the fixing rods 30 are extensions of the coupling legs 24. In particular, they extend from the substantially spherical engagement portions 26 away from the reflector 8'. The fixing rods 30 are smaller in diameter than the coupling legs 24 and smaller in diameter than the substantially spherical engagement portions 26.

When placing the reflector 8' on the support board 4 of the aircraft light 2 of FIG. 1 during manufacture, the fixing rods 30 are inserted in the openings 28 of the constraint shoes 22. Due to their small diameter, the fixing rods 30 have play with respect to the openings 28, and the reflector 8' is still exactly constrained with respect to the support board 4 via the six connection points between the substantially spherical engagement portions 26 and the v-shaped grooves of the constraint shoes 22.

The fixing rods 30 may be soldered to the support board 4 or may be clamped to the support board 4 by a bending operation or may be permanently fixed with respect to the support board 4 in any other suitable manner. In this way, a permanent fixation of the reflector 8' with respect to circuit board 4 can be achieved in a convenient manner, making use of the coupling legs 24 and their extensions.

FIGS. 3A to 3D show an aircraft light in accordance with a second exemplary embodiment of the invention in various views. In particular, the perspective views of FIGS. 3A and 3B correspond to the perspective views of FIGS. 1A and 1B of the first exemplary embodiment of the invention described above, the cross-sectional view of FIG. 3C corresponds to the cross-sectional view of FIG. 1C, and the top view of FIG. 3D corresponds to the top view of FIG. 1D. Overall, the set-up of the aircraft light 2 of FIG. 3 is similar to the aircraft light 2 of FIG. 1, with like components having the same reference numerals. The following description focuses on the components that differ among the aircraft light 2 of FIG. 3 and the aircraft light 2 of FIG. 1. For the remainder of the aircraft light 2 of FIG. 3, reference is made to the description of FIG. 1 above.

The aircraft light 2 of FIG. 3 comprises a support board 4, a light source 6, which is an LED 6 in the exemplary embodiment of FIG. 3, and a Fresnel-type lens 12. The Fresnel-type lens 12 is an optical element that conditions the light, as output from the LED 6.

The Fresnel-type lens 12 is arranged over the LED 6 and is coupled to the support board 4 via a kinematic coupling fixture 20. The kinematic coupling fixture 20 of the aircraft light 2 of FIG. 3 is similar to the kinematic coupling fixture 20 of the aircraft light 2 of FIG. 1. In particular, the three coupling legs 24 and their three engagement portions 26 are identical to the respective components, as for example shown in FIGS. 1A and 1B.

Different from the embodiment of FIG. 1, the constraint shoes 22 of the kinematic coupling fixture 20 of the aircraft light of FIG. 3 are machined into the support board 4. In particular, three v-shaped grooves are provided as receiving structures for the three engagement portions 26 within the support board 4. Similarly to FIGS. 1A, 1B and 1C, FIG. 3A shows the coupling legs 24 in engagement with the constraint shoes 22, FIG. 3B shows the engagement portions 26 spaced from the constraint shoes 22, and FIG. 3C shows the engagement between a single engagement portion 26 and a single v-shaped groove in a cross-sectional view. From the comparison of FIG. 1C and FIG. 3C, it becomes particularly apparent that the engagement portions 26 of FIG. 3 are at least partially sunk into the support board 4. FIG. 3D shows a top view of the aircraft light 2, with the coupling legs 24 and the constraint shoes 22, which are to a large extent blocked from view by the Fresnel-type lens 12, being shown in phantom.

With the Fresnel-type lens 12 of FIG. 3, a large number of refractive surfaces can be provided, enabling a lot of design freedom for conditioning the light output of the aircraft light 2.

Figure 4A:
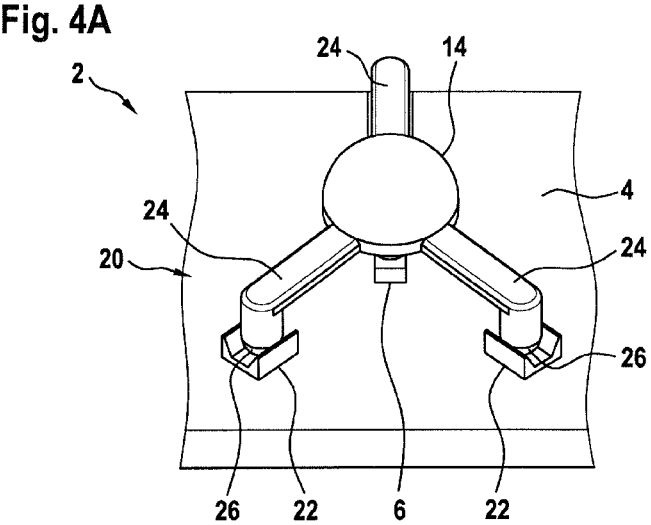
FIGS. 4A and 4B show an aircraft light in accordance with a third exemplary embodiment of the invention in various views.
Figure 4B:
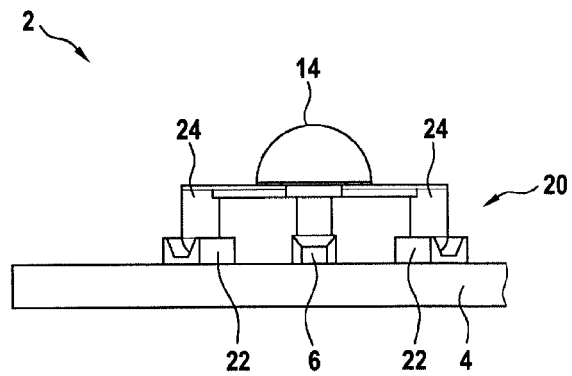

FIGS. 4A and 4B show an aircraft light 2 according a third exemplary embodiment of the invention in a perspective view and in a side view. The aircraft light 2 of FIG. 4 is similar to the aircraft light 2 of FIG. 1, with like components having the same reference numerals. As compared to the embodiment of FIG. 1, instead of a reflector 8 being arranged over LED 6, a collimating lens 14 is arranged over the LED 6. The collimating lens 14 is an optical element that is shaped to collimate light, as output by the LED 6, into a main light emission direction orthogonal to the support board 4.

The collimating lens 14 is fixed in position with respect to the support board 4 via a kinematic coupling fixture 20. While being overall similar to the kinematic coupling fixture 20 of the aircraft light of FIG. 1, the coupling legs 26 of the kinematic coupling fixture 20 of FIG. 4 are L-shaped. In this way, the smaller extension of the collimating lens 14, as compared to the reflector 8 of FIG. 1, is taken care of. Further, the engagement portions 26 of the coupling legs 24 of the kinematic coupling fixture 20 of FIG. 4 are semi-spherical. They do not extend in diameter as compared to the coupling legs 24. Rather, the engagement portions 26 of FIG. 4 form semi-spherical ends of the coupling legs 24.

While the arrangement of the reflector 8 over the LED 6 and the arrangement of the collimating lens 14 over the LED 6 have been shown as alternative embodiments, it is understood that it is also possible to arrange a lens reflector combination over the LED 6 and to couple said lens reflector combination to the support board 4 via a kinematic coupling fixture, as described herein. It is further possible to couple other combinations of optical elements, e.g. a lens shutter combination, to the support board via the kinematic coupling fixtures, as described herein.

Figure 5:
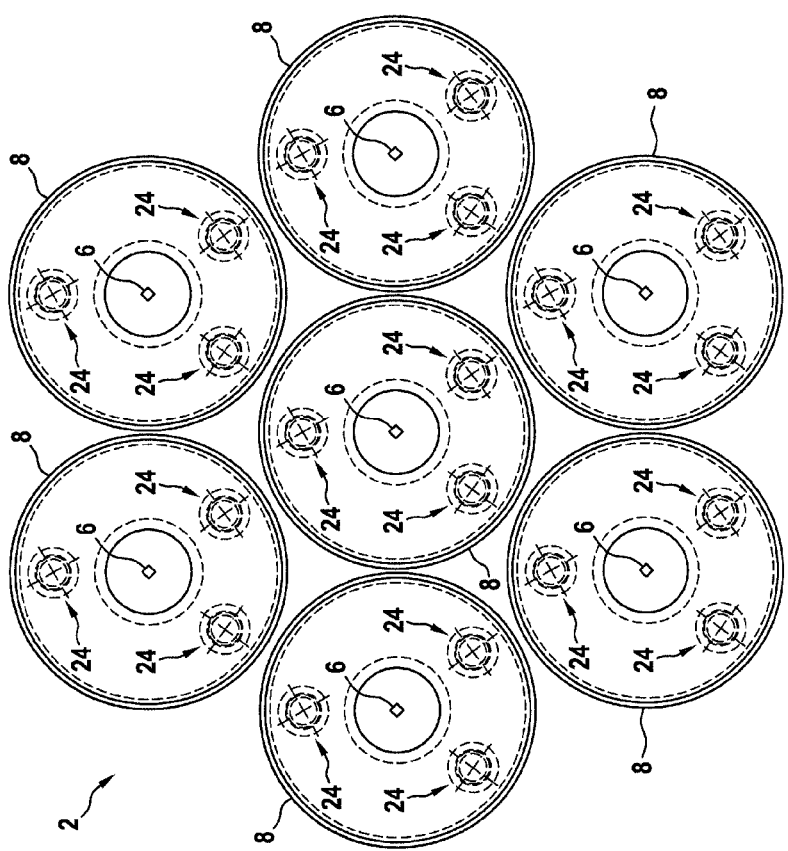
FIG. 5 shows an aircraft light in accordance with a fourth exemplary embodiment of the invention in a top view.

FIG. 5 shows an aircraft light 2 in accordance with a fourth exemplary embodiment of the invention in a top view. The aircraft light 2 of FIG. 5 has a plurality of design units, also referred to as structural units or building blocks, each comprising an LED 6 and an optical element, which is a reflector 8 in the exemplary embodiment of FIG. 5. The plurality of design units are arranged on a common support board, which is not shown in FIG. 5 for clarity of illustration.

For each of the design units, a kinematic coupling fixture is provided for coupling the reflector 8 to the support board. For each of the design units, the kinematic coupling fixture may be embodied as described in any of FIGS. 1 to 4 above. For clarity of illustration, only the coupling legs 24 are indicated in phantom in FIG. 5. They are arranged behind the reflectors 8 in the viewing direction of FIG. 5. It is understood that the coupling legs 24 cooperate with associated constraint shoes, as described above.

In the exemplary embodiment of FIG. 5, seven LEDs 6 and seven reflectors 8, each reflector 8 being associated with one LED 6, are provided. The seven structural units, consisting of an LED 6 and a reflector 8 each, are arranged in a very dense manner, with one structural unit being arranged at the center and the six other structural units being arranged therearound.

The light outputs of the structural units may reinforce each other. As a result, the aircraft light 2 has a very bright light output towards the observer in the viewing direction of FIG. 5. The collimation via the reflectors 8 may have high accuracy due to the accurate positioning of the reflectors 8 with respect to the LEDs 6, such that a highly collimated light output may be achieved.

Figure 6:
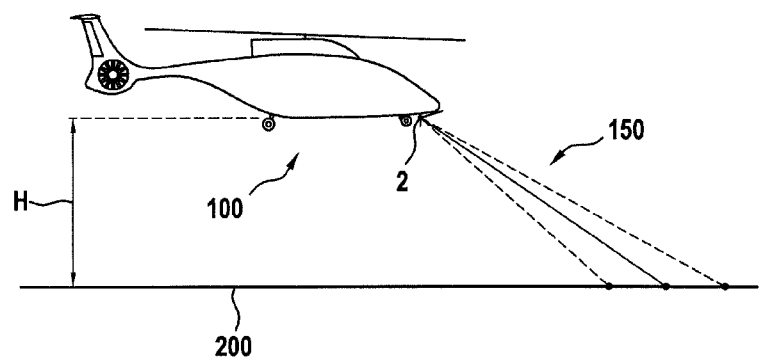
FIG. 6 shows a helicopter in accordance with an exemplary embodiment of the invention in a side view, the helicopter being equipped with a helicopter search light in accordance with an exemplary embodiment of the invention.

FIG. 6 shows a helicopter 100 in accordance with an exemplary embodiment of the invention, equipped with an aircraft light 2 in accordance with an exemplary embodiment of the invention, in a side view. The helicopter 100 is depicted as flying at a height H above ground 200. The helicopter 100 is equipped with a helicopter search light 2, mounted to a front bottom portion of the helicopter 100 and generating a light beam 150, which is directed downwards in front of the helicopter 100. For generating the light beam 150, the helicopter search light 2 may be embodied in accordance with any of the embodiments of aircraft lights 2, described herein. The helicopter search light 2 may also be arranged at a different location of the helicopter 100, such as at the front running gear.

Figure 7:
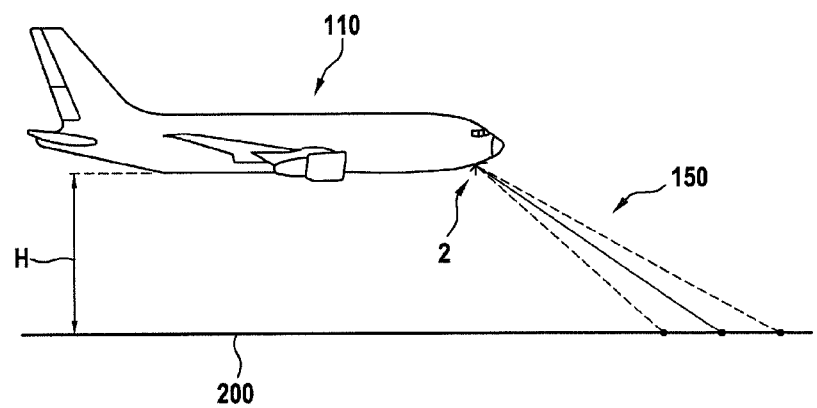
FIG. 7 shows a airplane in accordance with an exemplary embodiment of the invention in a side view, the airplane being equipped with an aircraft headlight in accordance with an exemplary embodiment of the invention.

FIG. 7 shows an airplane 110 in accordance with an exemplary embodiment of the invention, equipped with an aircraft light 2 in accordance with an exemplary embodiment of the invention, in a side view. The airplane 110 is depicted as flying at a height H above ground 200. The airplane 110 is equipped with an aircraft headlight 2, which is an aircraft landing light 2 in the exemplary embodiment of FIG. 7. The aircraft headlight 2 is mounted to a front bottom portion of the airplane 110 and generates a light beam 150, which is directed downwards in front of the airplane 110. For generating the light beam 150, the aircraft headlight 2 may be embodied in accordance with any of the embodiments of aircraft lights 2, described herein. The aircraft headlight 2 may also be arranged at a different location of the airplane 110, such as at the front running gear.

Figure 8:
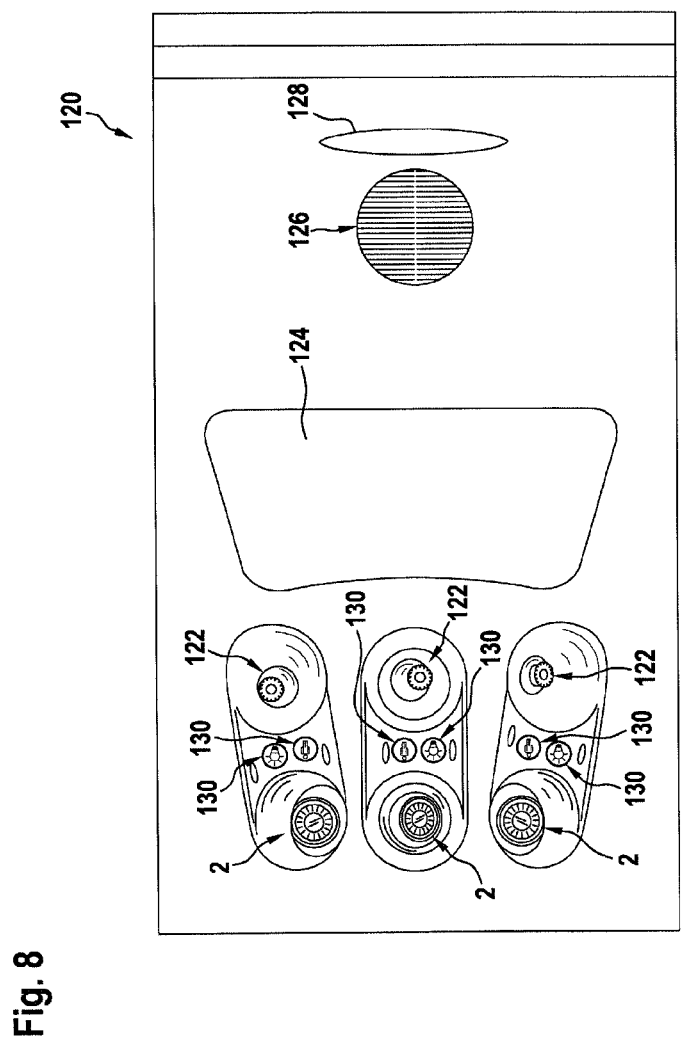
FIG. 8 shows an overhead passenger service unit, comprising reading lights in accordance with exemplary embodiments of the invention, in a schematic view.

FIG. 8 shows an overhead passenger service unit 120, as it may be installed in the passenger cabin of an aircraft, in a schematic view from the point of view of a passenger sitting below the overhead passenger service unit 120.

On the side depicted to the left in FIG. 8, the overhead passenger service unit 120 comprises a row of three adjustable personal reading lights 2, arranged next to each other in a lateral direction. Each of the personal reading lights 2 may be embodied in accordance with any of the embodiments of aircraft lights 2, described herein.

Six electrical switches 130 are provided to the right side of the personal reading lights 2, a pair of two switches 130 next to each of the personal reading lights 2. One of the switches 130 of each pair may be configured for switching the adjacent personal reading light 2, while the second switch of each pair may be configured for triggering a signal for calling cabin service personnel.

A row of three adjacent gaspers 122 arranged in the lateral direction is provided next to the switches 130. The overhead passenger service unit 120 further comprises a loudspeaker 126, a display panel 128, and a covered cavity 124 for housing at least one oxygen mask (not shown).

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An aircraft light comprising:
   a support board;
   a light source, arranged on the support board;
   an optical element, arranged over the light source; and
   a kinematic coupling fixture establishing a fixed position of the optical element with respect to the support board
   wherein the kinematic coupling fixture comprises:
      three constraint shoes arranged on the support board, each of the three constraint shoes comprises a v-shaped groove; and
      three coupling legs, each coupling leg extending from the optical element and being in engagement with a respective one of the three constraint shoes.

2. The aircraft light according to claim 1, wherein the kinematic coupling fixture constrains six degrees of freedom of the optical element with respect to the support board.

3. The aircraft light according to claim 1, wherein the v-shaped grooves are arranged around a center portion of the kinematic coupling fixture and are oriented towards the center portion of the kinematic coupling fixture.

4. The aircraft light according to claim 1, wherein the three constraint shoes are arranged around the light source in a non-rotationally-symmetric manner.

5. The aircraft light according to claim 1, wherein the three constraint shoes are attached to, in particular glued to or soldered to, the support board or wherein the three constraint shoes are machined into the support board.

6. The aircraft light according to claim 1, wherein each of the three coupling legs has an at least partially spherical engagement portion.

7. The aircraft light according to claim 1, wherein each of the three coupling legs has a fixing rod, extending through the respective constraint shoe and extending into or through the support board.

8. The aircraft light according to claim 7, wherein the fixing rod is permanently fixed to the support board, wherein the fixing rod is in particular soldered to the support board and/or bent around a backside of the support board.

9. The aircraft light according to claim 1, wherein the support board is a printed circuit board or a molded interconnect device.

10. The aircraft light according to claim 1, wherein the optical element comprises at least one of:
    a reflector,
    a lens,
    a lens reflector combination,
    a lens shutter combination.

11. The aircraft light according to claim 1, wherein the aircraft light is an exterior aircraft light, wherein the aircraft light is in particular at least one of a navigation light, a white anti-collision strobe light, a red-flashing beacon light, a take-off light, a taxi light, a runway turn-off light, a landing light, a logo light, a cargo light, a wing scan light, an engine scan light, and a search light.

12. The aircraft light according to claim 1, wherein the aircraft light is an interior aircraft light, wherein the aircraft light is in particular at least one of a cabin illumination light, a washroom illumination light, a galley illumination light, an aisle guidance light, a reading light, and an exit sign light.

13. The aircraft, such as an airplane or a helicopter, comprising at least one aircraft light in accordance with claim 1.

* * * * *